(12) United States Patent
Pedretti et al.

(10) Patent No.: US 12,391,320 B2
(45) Date of Patent: Aug. 19, 2025

(54) GUIDE RAIL FOR CRAWLER TRACK

(71) Applicant: Joy Global Surface Mining Inc, Milwaukee, WI (US)

(72) Inventors: Ethan Pedretti, Holmen, WI (US); Pat Sterling, West Allis, WI (US)

(73) Assignee: Joy Global Surface Mining Inc, Milwaukee, WI (US)

( * ) Notice: Subject to any disclaimer, the term of this patent is extended or adjusted under 35 U.S.C. 154(b) by 627 days.

(21) Appl. No.: 17/575,421

(22) Filed: Jan. 13, 2022

(65) Prior Publication Data

US 2022/0219770 A1     Jul. 14, 2022

Related U.S. Application Data

(60) Provisional application No. 63/137,059, filed on Jan. 13, 2021.

(51) Int. Cl.
| | |
|---|---|
| *B62D 55/084* | (2006.01) |
| *B62D 55/10* | (2006.01) |
| *B62D 55/14* | (2006.01) |

(52) U.S. Cl.
CPC ..... *B62D 55/0847* (2013.01); *B62D 55/0845* (2013.01); *B62D 55/10* (2013.01); *B62D 55/14* (2013.01)

(58) Field of Classification Search
CPC . B62D 55/10; B62D 55/0845; B62D 55/0847
See application file for complete search history.

(56) References Cited

U.S. PATENT DOCUMENTS

| | | | |
|---|---|---|---|
| 5,941,326 | A | 8/1999 | Fleuchaus |
| 10,183,709 | B2 | 1/2019 | Kim |
| 10,328,981 | B2 * | 6/2019 | Sibilleau ................ B62D 55/10 |
| 11,834,113 | B2 * | 12/2023 | Schroyer ............ B62D 55/0847 |
| 2004/0094392 | A1 | 5/2004 | Boudraeu |
| 2015/0266527 | A1 | 9/2015 | Akinlua et al. |
| 2015/0353152 | A1 | 12/2015 | Hakes et al. |
| 2017/0361883 | A1 | 12/2017 | Scheuerman et al. |
| 2018/0065691 | A1 | 3/2018 | Dumitru |
| 2018/0170463 | A1 | 6/2018 | Dumitru et al. |

OTHER PUBLICATIONS

International Search Report and Written Opinion for Application No. PCT/US22/12352 dated Apr. 1, 2022 (15 pages).
Chilean Search Report for Application No. 202301990, dated Jul. 24, 2024, 19 pages.

* cited by examiner

*Primary Examiner* — Jason R Bellinger
(74) *Attorney, Agent, or Firm* — Husch Blackwell LLP

(57) ABSTRACT

A replaceable guide rail for a crawler includes a base that has a flange. The replaceable guide rail further includes a hole extending laterally through the flange that is configured to receive a fastener to secure a portion of the crawler to the flange, a guide member extending along the centerline and being configured to contact a track portion of the crawler and be worn down during movement of the track portion over the guide member, and a wear indicator positioned in the guide member configured to indicate whether the guide rail is in condition for replacement. The guide member has a thickness that is reduced as the guide member is worn down. The wear indicator is covered while the thickness is in a first range of thickness, and the wear indicator is exposed while the thickness is in a second range of thickness.

20 Claims, 12 Drawing Sheets

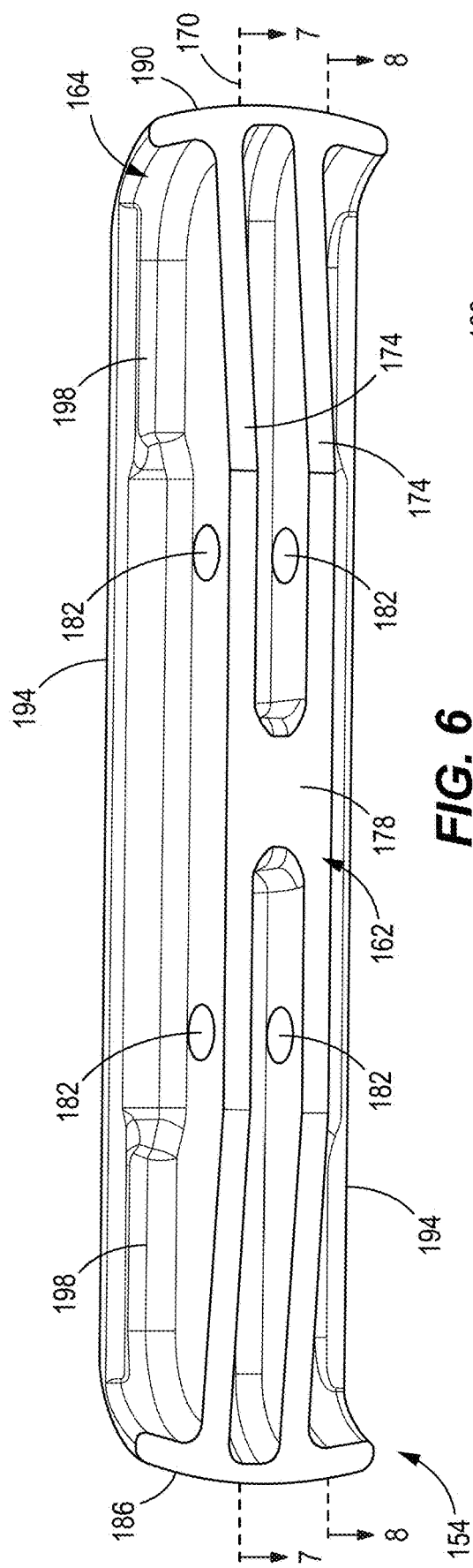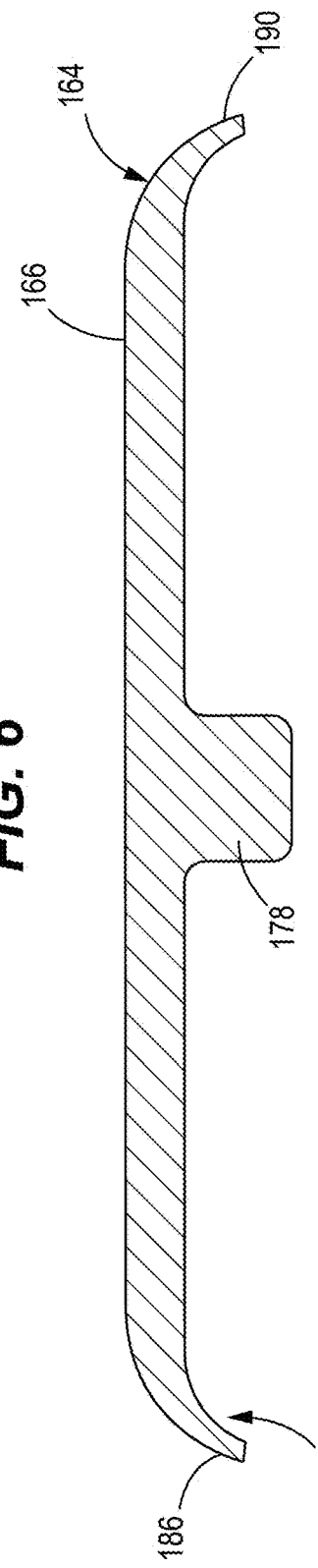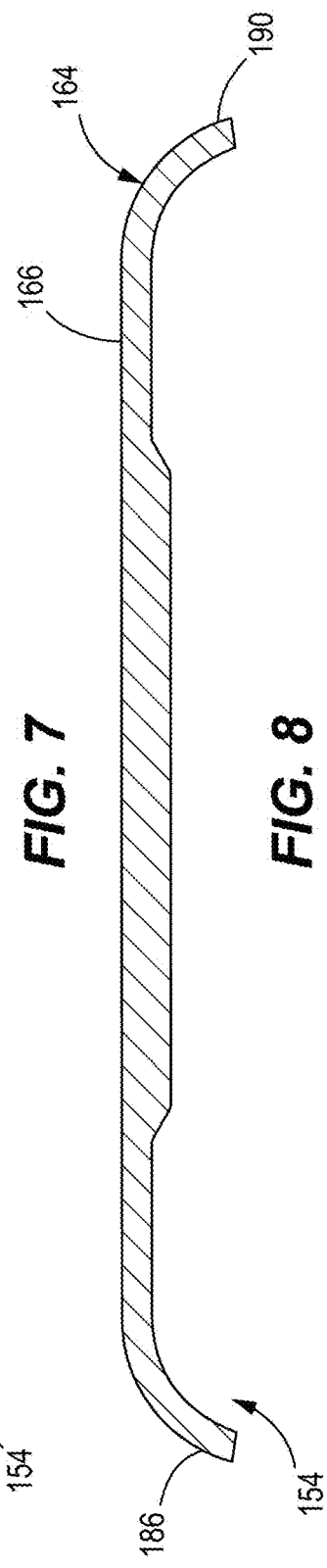

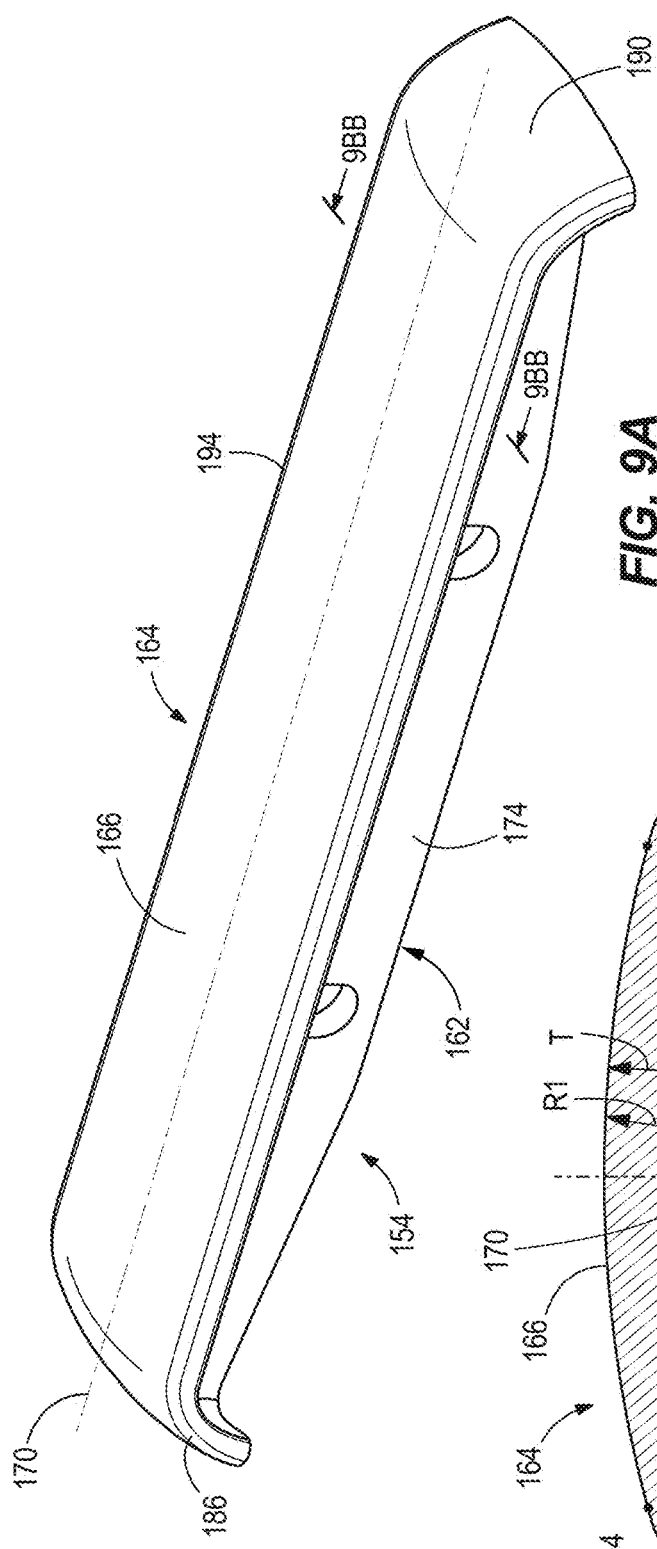
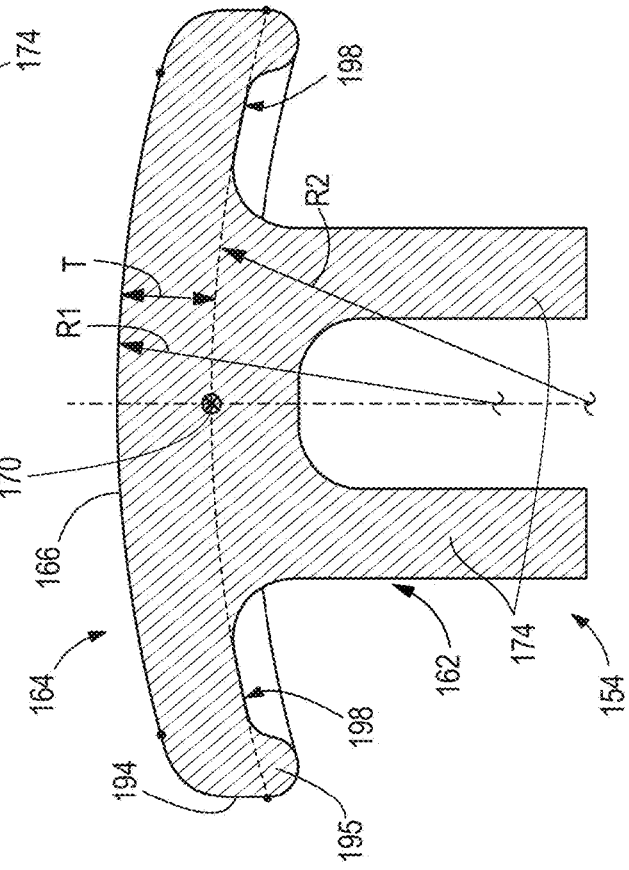

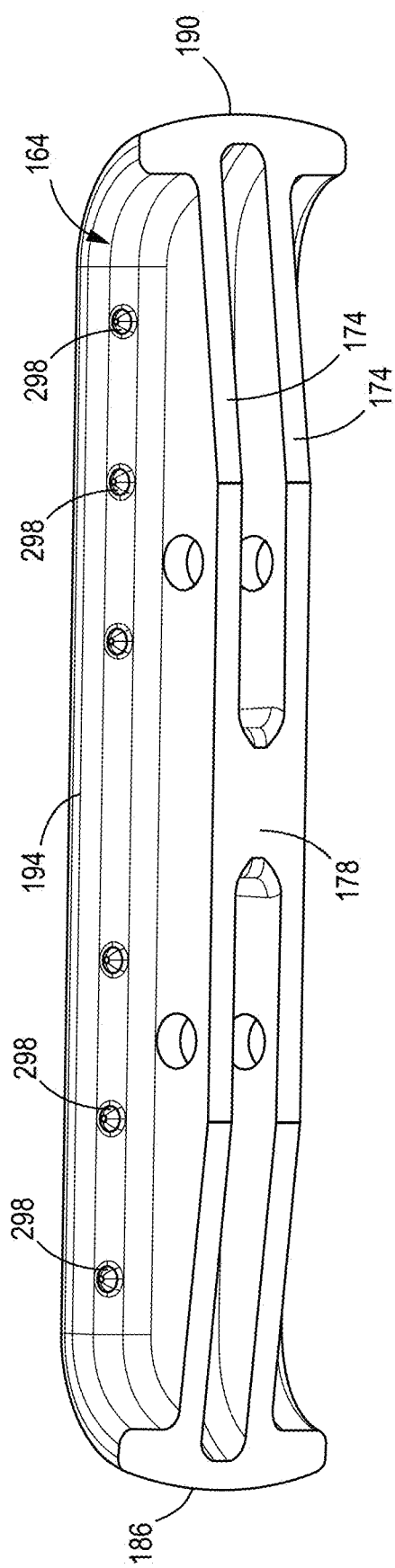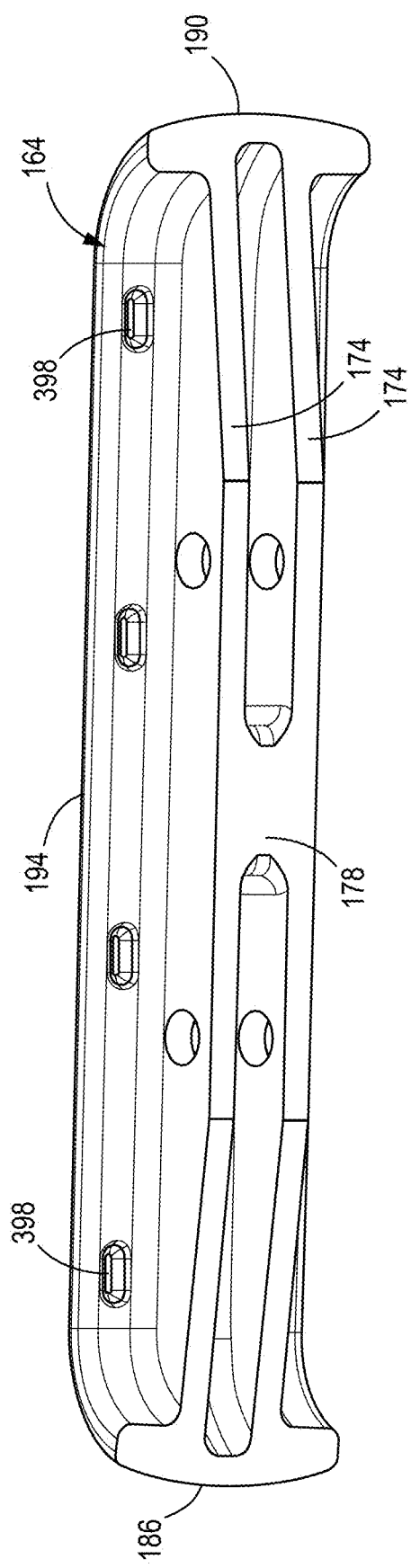

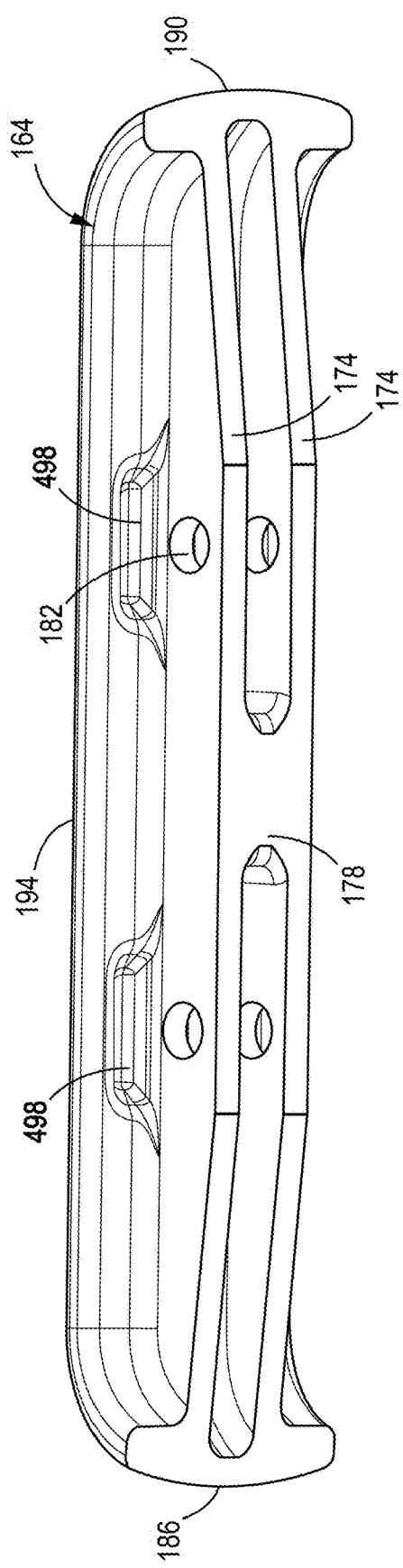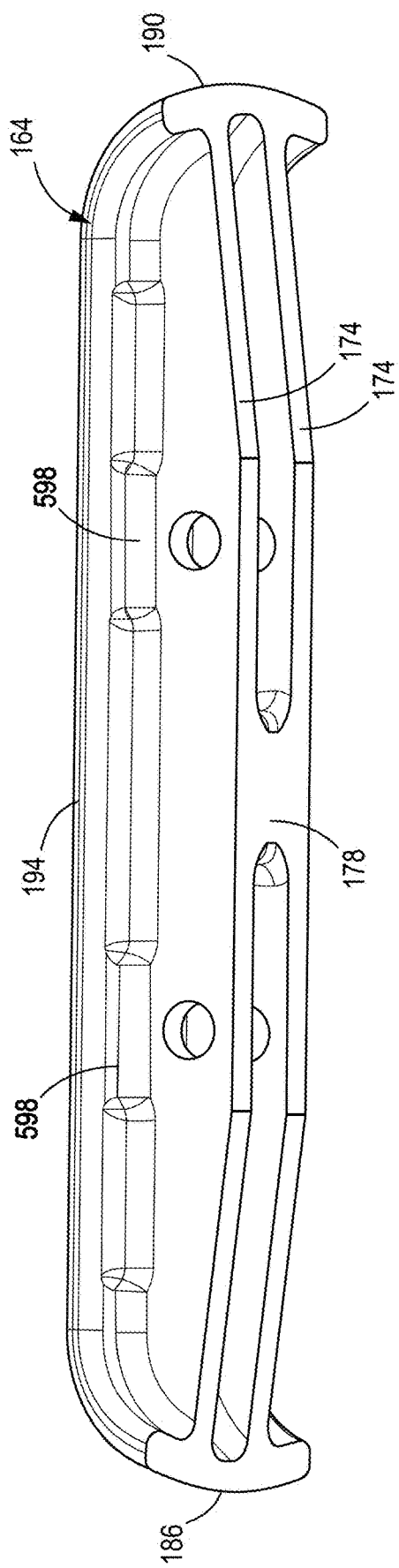
FIG. 13
FIG. 14

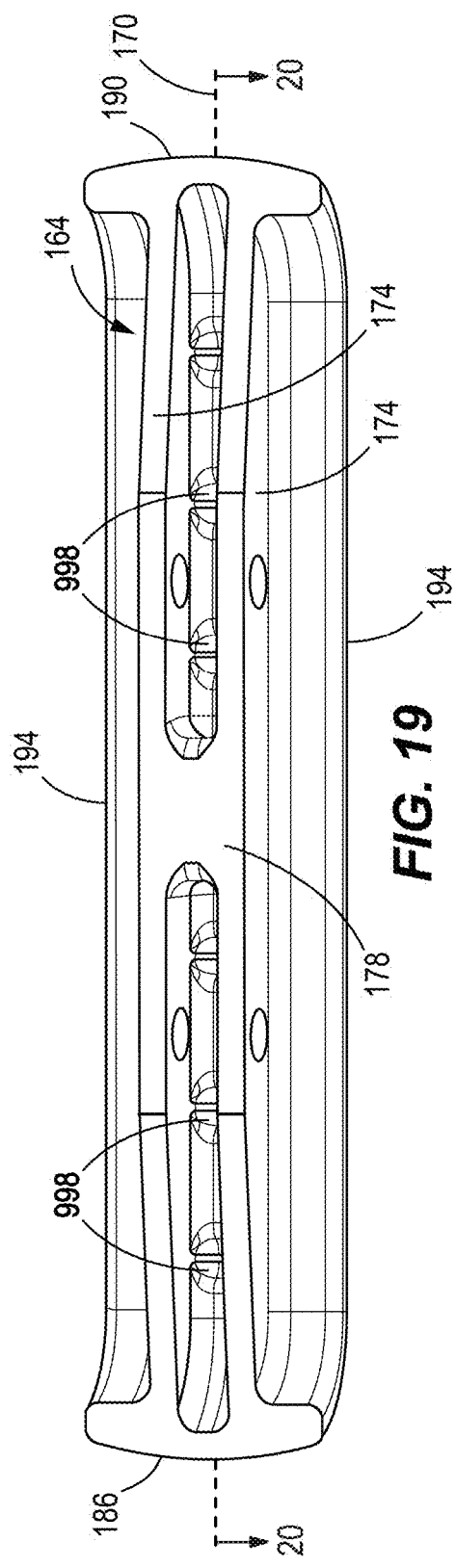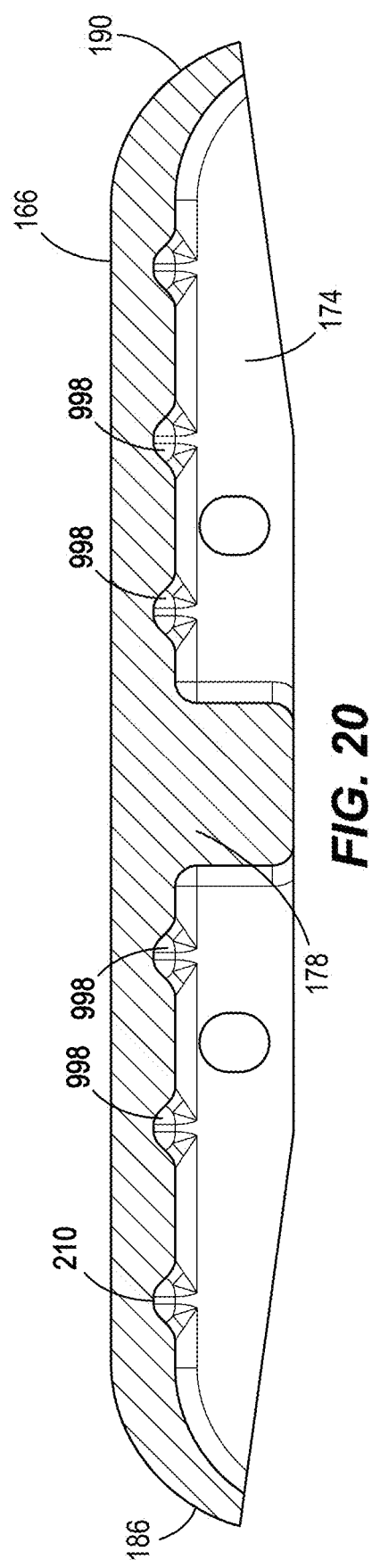

GUIDE RAIL FOR CRAWLER TRACK

CROSS-REFERENCE TO RELATED APPLICATIONS

This application claims the benefit of U.S. Provisional Patent Application No. 63/137,059, filed Jan. 13, 2021, the entire content of which is incorporated herein by reference.

FIELD

The present disclosure relates to industrial machines and, more particularly, to a guide rail for a crawler of a mining machine.

Conventional earth-moving machines, such as mining shovels and excavators, include crawler mechanisms for moving the machine over the ground. The crawler mechanism includes an articulated track composed of multiple links or shoes coupled together to form a continuous loop. The shoes engage the ground and engage a row of rollers along a roller path as the track is driven. The weight of the machine and any loads supported by the machine are transmitted through the rollers to the shoes, thereby causing the shoes to wear down and/or deform over time.

SUMMARY

In one independent aspect, replaceable guide rail for a crawler including a frame and a track drivable around the frame includes a base elongated along a centerline, the base configured to be removably coupled to the frame; a wearable portion supported by the base and having an outer surface configured to be in contact with the track, the wearable portion having a first thickness at an initial stage of operation and a second thickness at a second stage of operation, the second thickness being less than the first thickness; and a wear indicator positioned in the wearable portion, the wear indicator being covered while the wearable portion has the first thickness, the wear indicator being exposed while the wearable portion has the second thickness.

In another independent aspect, a crawler assembly for an earthmoving machine includes a plurality of shoes coupled together to form a continuous track, the track being configured to be driven around a perimeter of a crawler frame; a replaceable guide rail configured to be removably coupled to the frame, the guide rail including a surface contacting the shoes as the track is driven around the perimeter of the frame, the surface including a material that wears away as the shoes contact the surface; and a wear indicator positioned on a portion of the guide rail, the wear indicator being exposed through the outer surface of the guide rail as the shoes contact the guide rail In another independent aspect, a replaceable guide rail for a crawler of an earthmoving machine includes a base elongated along a centerline, the base including a flange; a hole extending laterally through the flange, the hole being configured to receive a fastener to secure a portion of the crawler to the flange; a guide member extending along the centerline and being configured to contact a track portion of the crawler and be worn down during movement of the track portion over the guide member, the guide member having a thickness that is reduced as the guide member is worn down; and a wear indicator positioned in the guide member configured to indicate whether the guide rail is in condition for replacement, the wear indicator being covered while the thickness is in a first range of thickness, and the wear indicator being exposed while the thickness is in a second range of thickness.

Other independent aspects will become apparent by consideration of the detailed description and accompanying drawings.

BRIEF DESCRIPTION OF THE DRAWINGS

FIG. 6 is a perspective view of a guide rail.
FIG. 7 is a section view of the guide rail of FIG. 6 viewed along section 7-7.
FIG. 8 is a section view of the guide rail of FIG. 6 viewed along section 8-8.
FIG. 9A is another perspective view of the guide rail of FIG. 6, illustrating an initial condition of the guide rail with a plurality of openings not exposed.
FIG. 9B is a section view of the guide rail of FIG. 9B viewed along section 9B-9B.
FIG. 11 is a perspective view of a guide rail according to another embodiment.
FIG. 12 is a perspective view of a guide rail according to another embodiment.
FIG. 13 is a perspective view of a guide rail according to another embodiment.
FIG. 14 is a perspective view of a guide rail according to another embodiment.
FIG. 19 is a perspective view of a guide rail according to another embodiment.
FIG. 20 is a section view of the guide rail of FIG. 19 viewed along section 20-20.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted,"

"connected," "supported," and "coupled" and variations thereof are used broadly and encompass both direct and indirect mountings, connections, supports, and couplings.

DETAILED DESCRIPTION

Figure 1:
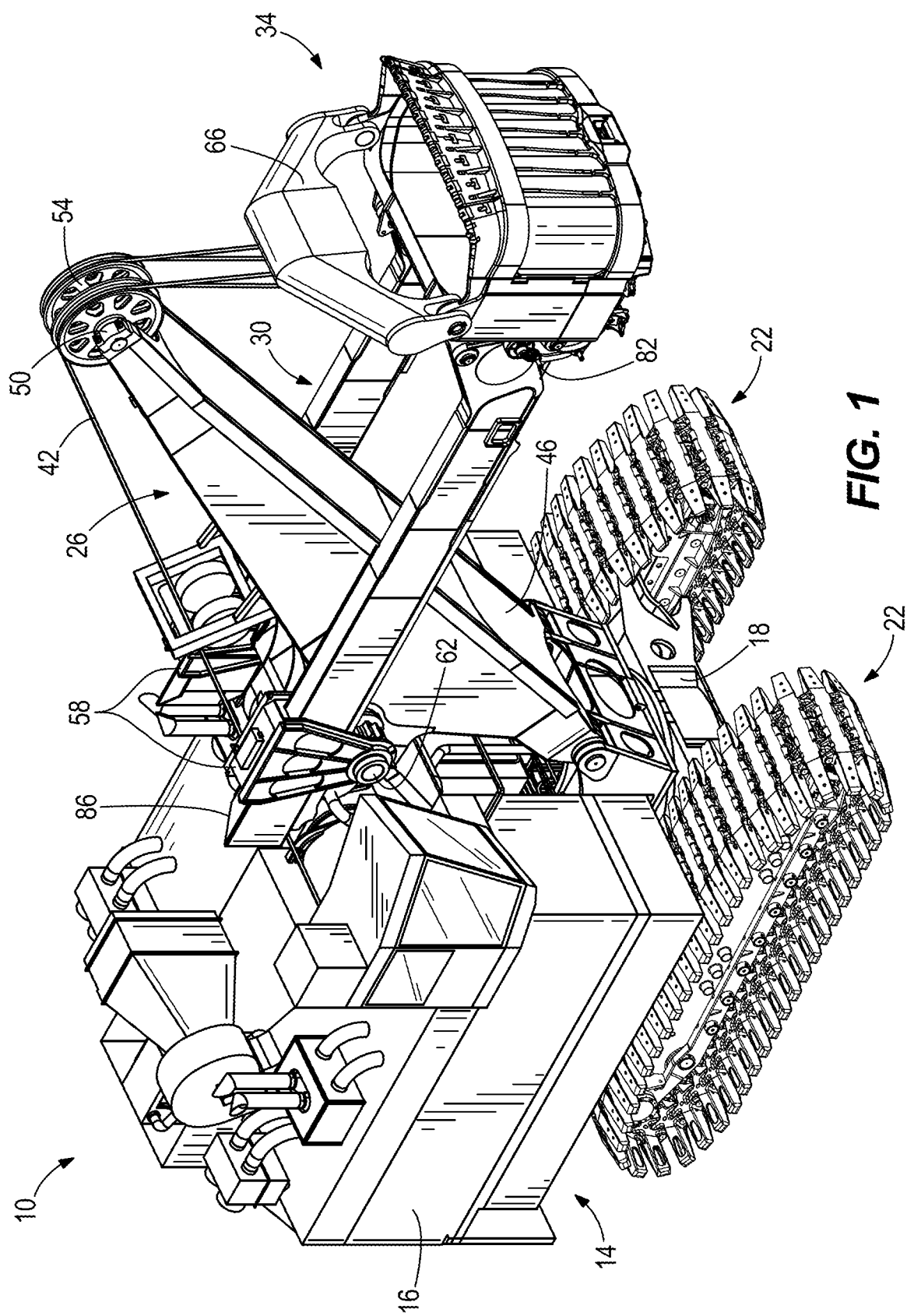
FIG. 1 is a perspective view of a mining shovel.

FIG. 1 illustrates an earthmoving machine, such as a mining shovel 10, including a frame 14 supporting a boom 26, an elongated member or stick or handle 30, and an attachment or dipper 34 coupled to the handle 30. The frame 14 includes an upper portion 16 that is supported by an undercarriage 18 having crawlers 22. The upper portion 16 supports a hoist drum (not shown) for reeling in and paying out a cable or hoist rope 42. The boom 26 includes a first end 46 coupled to the upper portion 16 of the frame 14 and a second end 50 opposite the first end 46, and a boom sheave 54 is coupled to the second end 50 of the boom 26 and guides the rope 42 over the second end 50. In the illustrated embodiment, the shovel includes a saddle block 58 rotatably coupled to the boom 26 by a shipper shaft 62, which is positioned between the first end 46 and the second end 50 of the boom 26. The shipper shaft 62 extends through the boom 26 in a direction that is transverse to a longitudinal axis of the boom 26. The hoist rope 42 is coupled to the dipper 34 by a bail 66, and the dipper 34 is raised or lowered as the hoist rope 42 is reeled in or paid out, respectively, by the hoist drum.

The handle 30 includes a first end 82 and a second end 86. In the illustrated embodiment, the second end 86 is movably received in the saddle block 58, and the handle 30 passes through the saddle block 58 such that the handle 30 is capable of rotational and translational movement relative to the boom 26. The saddle block 58 is rotatable relative to the boom 26 about the shipper shaft 62, and the handle 30 rotates relative to the boom 26 while the handle 30 remains in the saddle block 58.

Figure 2:
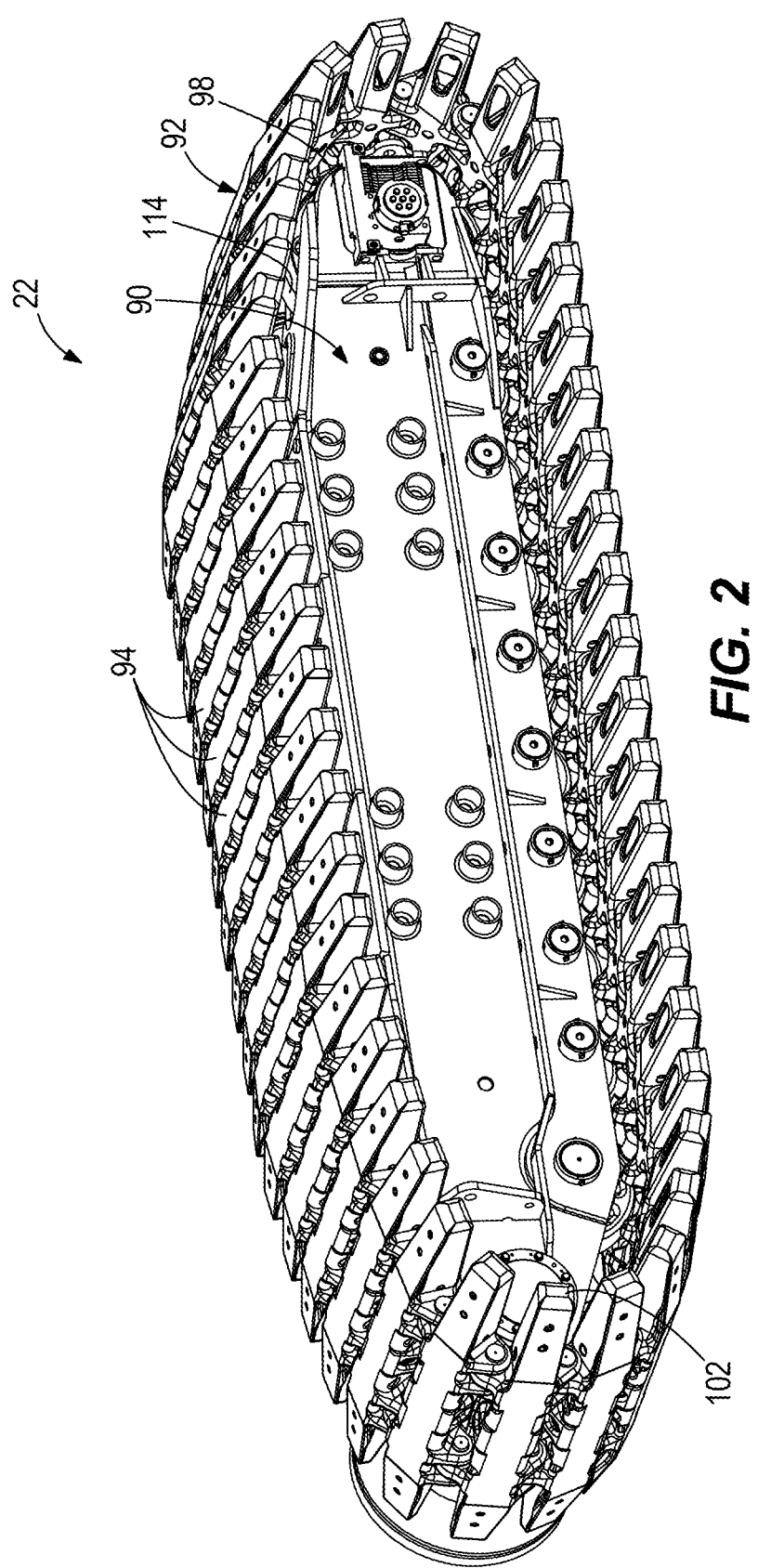
FIG. 2 is a perspective view of a crawler.
Figure 3:
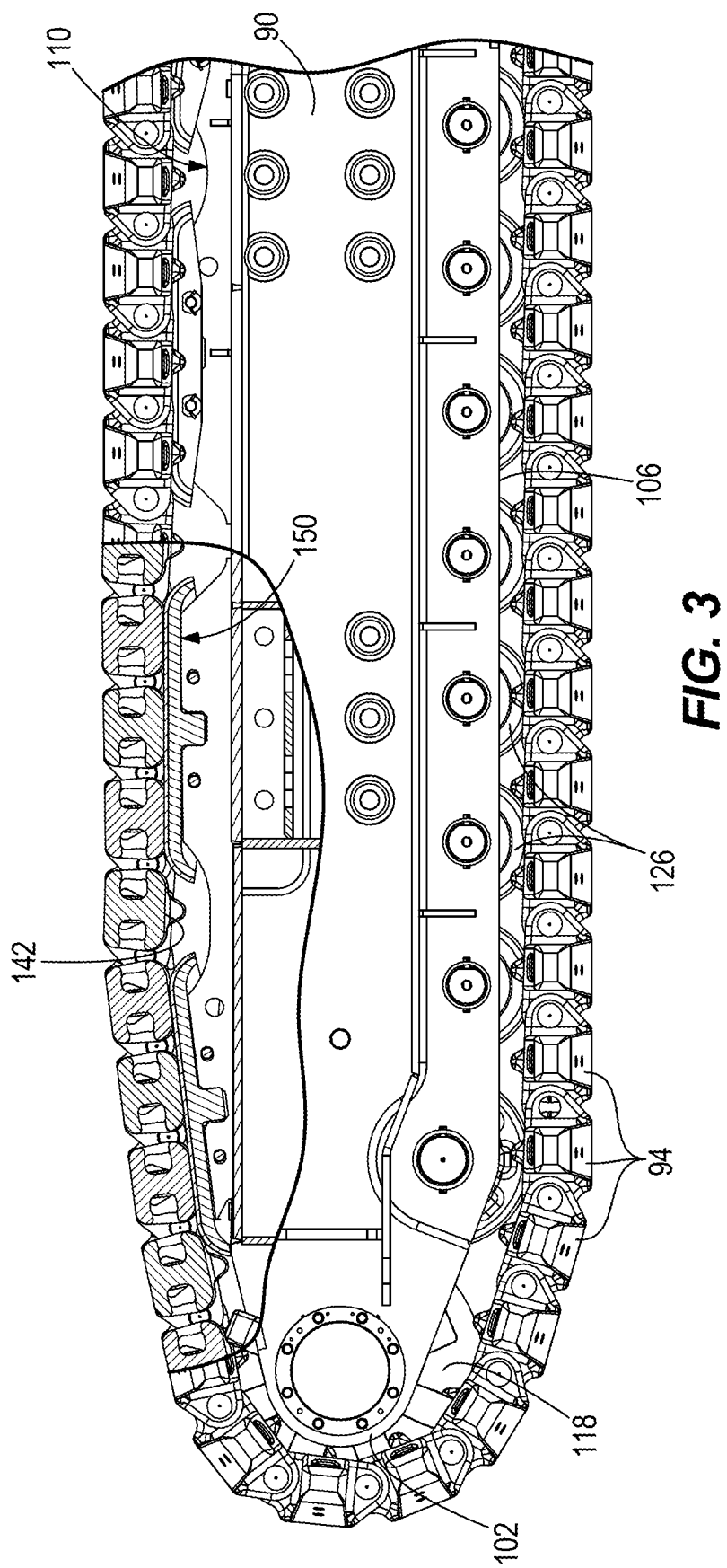
FIG. 3 is a side view of a portion of the crawler of FIG. 2.

As shown in FIGS. 2 and 3, each crawler 22 includes a track frame 90 and a track 92 including links or shoes 94 coupled together to form an articulated, continuous loop. The track frame 90 includes a first end 98, a second end 102, a first or lower portion 106, and a second or upper portion 110. In the illustrated embodiment, a driving member 114, such as a first sprocket 114 (FIG. 2), is supported for rotation at the first end 98, and a second driving member 118 (e.g., second sprocket 118; FIG. 3) is supported for rotation at the second end 102 of the frame 90. At least one of the sprockets 114, 118 may be driven by a motor (not shown). The sprockets 114, 118 engage the crawler shoes 94 (e.g., by teeth extending into spaces between the shoes 94), thereby driving the shoes 94 around the perimeter of the track frame 90 in a continuous loop. The track 92 defines a first or lower run proximate the ground and a second or upper run extending along the upper portion 110 of the frame 90. As the shoes 94 move along the lower run, the shoes 94 engage the ground to move the machine 10 with respect to the ground.

Figure 4:
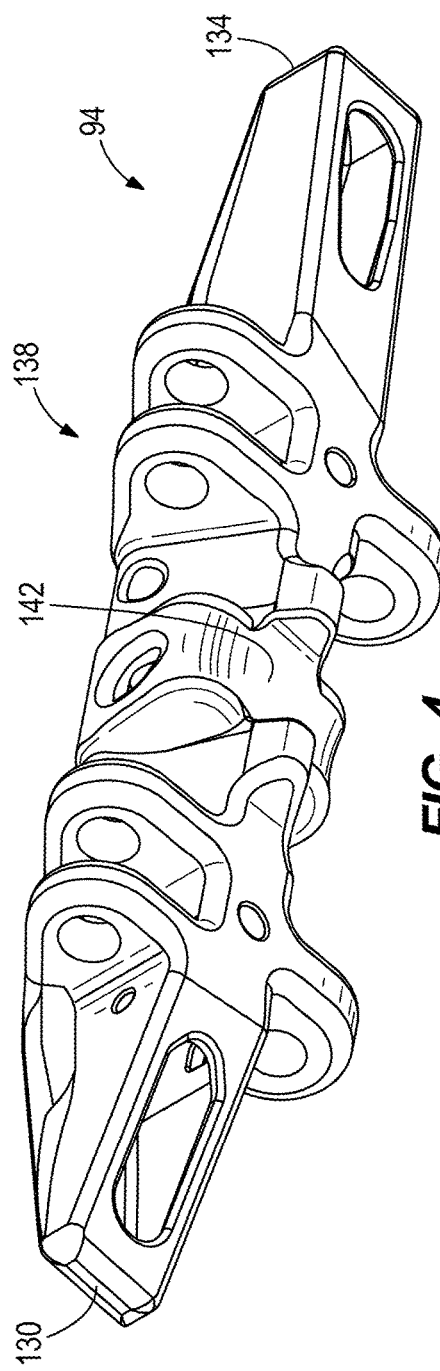
FIG. 4 is a perspective view of a shoe.

As shown in FIG. 3, rollers 126 are rotatably coupled to the lower side 106 of the frame 90. In the illustrated embodiment, the rollers 126 are aligned with one another such that all of the rollers 126 rotate in a common plane. Stated another way, the rollers 126 are aligned along a direction of travel of the shoes 94. As shown in FIG. 4, each shoe 94 includes a first end 130, a second end 134, and an intermediate portion 138 positioned between the first end 130 and the second end 134. The shoes 94 are driven in a direction that is generally perpendicular to a line drawn between the first end 130 and the second end 134. The intermediate portion 138 includes a wear surface or roller path area 142. In the illustrated embodiment, the shoes 94 include sprocket engagement portions engaging the sprockets 114, 118, which drive the shoes 94 around the frame 90.

Figure 5:
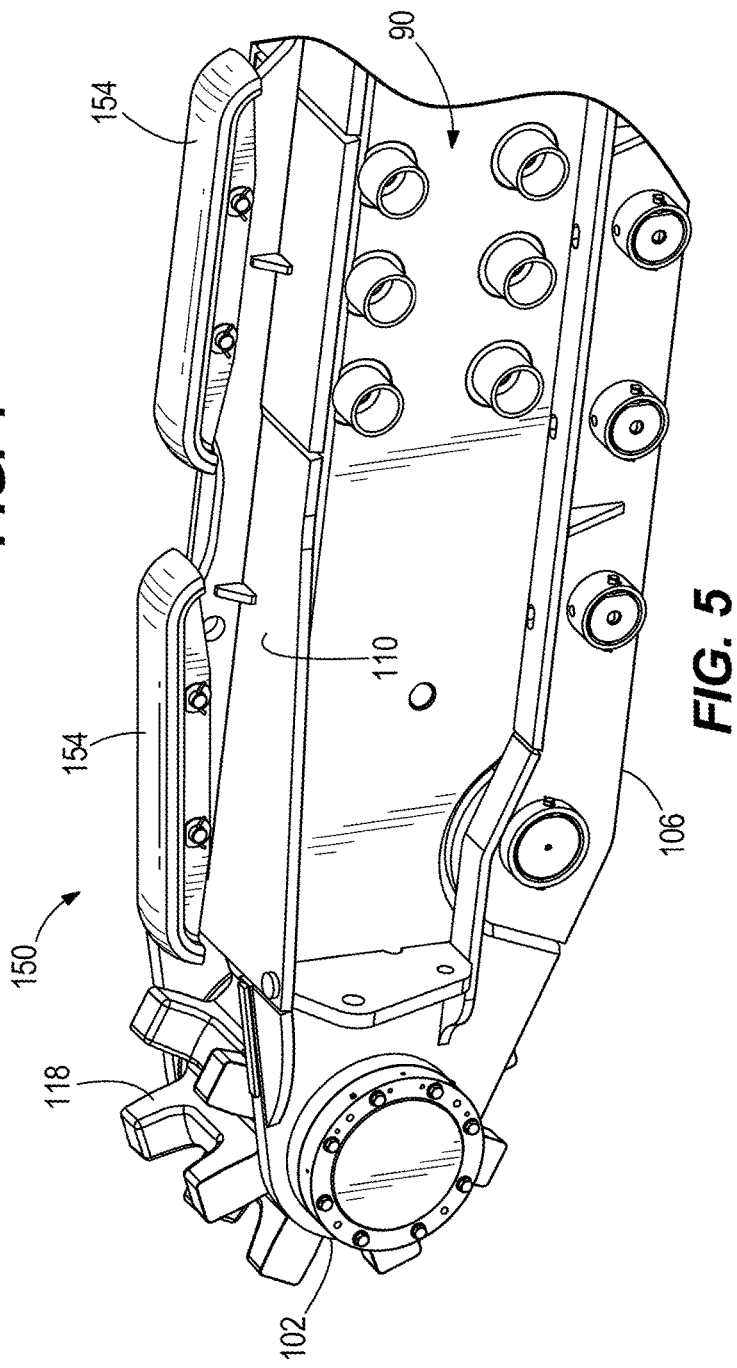
FIG. 5 is a perspective view of a portion of a track frame including a guide rail assembly.

FIG. 5 illustrates a guide rail assembly 150 extending along an upper portion 110 of the track frame 90. In the illustrated embodiment, the guide rail assembly 150 includes multiple rails 154 (e.g., four rails), each having an elongated shape and aligned parallel to the direction of travel of the shoes 94. Stated another way, the rails 154 are aligned in an end-to-end configuration such that all of the rails 154 extend along a common plane. Each rail 154 is independently coupled to the upper portion 110 of the track frame 90 (e.g., by a bolted connection), and each rail 154 can be removed and replaced without requiring disassembly of any adjacent rails 154. In other embodiments, the track frame 90 may include fewer or more rails, the rails may be oriented in a different manner, and/or the rails may be coupled to the track frame 90 in a different manner.

As the shoes 94 are driven around the track frame 90, the wear surface 142 of the shoe 94 moves along the guide rail 154 while in a vicinity of the upper portion 110 of the track frame 90 and contacts the rollers 126 in a vicinity of the lower side 106. Each time the wear surface 142 of the shoe 94 contacts the guide rail 154, a portion of the guide rail 154 wears at least slightly.

Referring now to FIGS. 6-10B, each guide rail 154 includes a base 162 for coupling to the frame 90 (FIG. 4), and a guide member 164. The guide member 164 includes an outer surface 166 for engaging the shoes 94 as they move around the frame 90, and the guide member 164 extends along a centerline 170 (FIGS. 9A-10B). In the illustrated embodiment, the base 162 includes a pair of flanges 174 oriented parallel to one another and parallel to the centerline 170, and a central portion or web 178 extends between the flanges 174. Openings or holes 182 extend laterally through the flanges 174, and are configured to receive a fastener (e.g., a bolt) to secure a portion of the track frame 90 between the flanges 174. In other embodiments, the base may be constructed in a different manner.

The guide member 164 includes a first end 186 and a second end 190 opposite the first end 186, and the centerline 170 extends between the first end 186 and the second end 190. Side portions or wings 194 extend between the first end 186 and the second end 190 and are positioned laterally outward from the centerline 170. In the illustrated embodiment, the ends 186, 190 of the guide member 164 are angled toward the frame 90.

The guide member 164 also includes a wear indicator portion 198. As best shown in FIG. 9B, the wear indicator portion 198 may include a portion having a thickness that is less than a thickness of the adjacent portion of the guide member 164. In the illustrated embodiment, the wear indicator portion 198 includes a recess formed on a lower surface of the guide member 164, opposite the outer surface 166. The wear indicator portion 198 is positioned on the wing 194, between a lateral edge of the guide member 164 and the associated flange 174, and between the ends 186, 190 and the central portion of the base 162.

As shown in FIGS. 9A and 9B, the guide member 164 has an initial wearable thickness T. In the illustrated embodiment, the outer surface 166 has an initial condition in which the outer surface 166 has an initial radius of curvature R1 with and initial arclength. In the illustrated embodiment, the initial arclength can be defined by an amount of material that forms the outer surface 166. As the guide member 164 wears, the thickness is reduced from the initial thickness T, and the outer surface 166 approaches a final condition in which the outer surface 166 has a radius that is different from the initial radius R1. Once the thickness of the guide member 164 wears to a predetermined level, as defined below, the outer surface 166 has a final arclength and a final radius of curvature R2. In the illustrated embodiment, the final arclength is less than the initial arclength or substantially similar to the initial arclength. The initial radius R1 and the final radius R2 may be substantially similar when measured from offset center points (e.g., offset by an amount the thickness T wears). In the illustrated embodiment, outer surface 166 has an arched profile at an initial stage, and has a flatter (e.g., less arched) profile at a later stage as the thickness T is reduced.

For example, as the shoes 94 are driven around the track frame 90 against the outer surface 166 of the guide member 164, the material thickness is reduced from the initial thickness T and the radius is increased from the initial radius R1 (e.g., due to a curved overall cross-section of the guide member 164). In some embodiments, the outer surface 166 may have little to no curvature such that the initial arclength and final arclength remain substantially similar as the initial thickness T is decreased; in other embodiments, the final arclength may be less than the initial arclength.

When the outer surface 166 has worn to a predetermined level, such as an end-of-life or alert level, one or more of the wear indicator portions 198 will create a visible opening or window 196 (FIGS. 10A and 10B) extending through the guide member 164. In the illustrated embodiment, the window 196 is elongated. A lip 195 may be formed on the guide member 164 and positioned between the wear indicator portion 198 and an outer surface of the wing 194. In some instances along the centerline 170, the lip 195 may be situated between a portion of the window 196 and the outer surface of the wing 194.

Figure 10A:
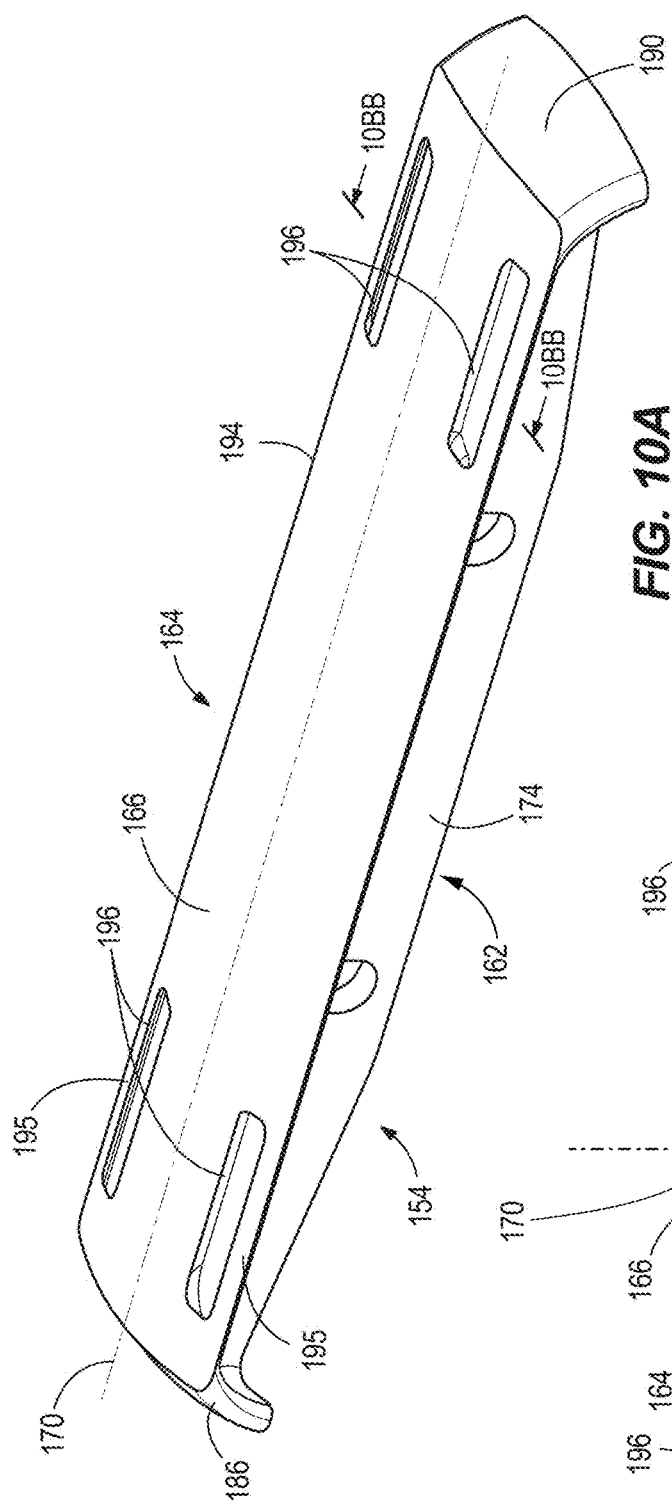
FIG. 10A is a perspective view of the guide rail of FIG. 6, illustrating a final condition of the guide rail with a plurality of openings exposed.
Figure 10B:
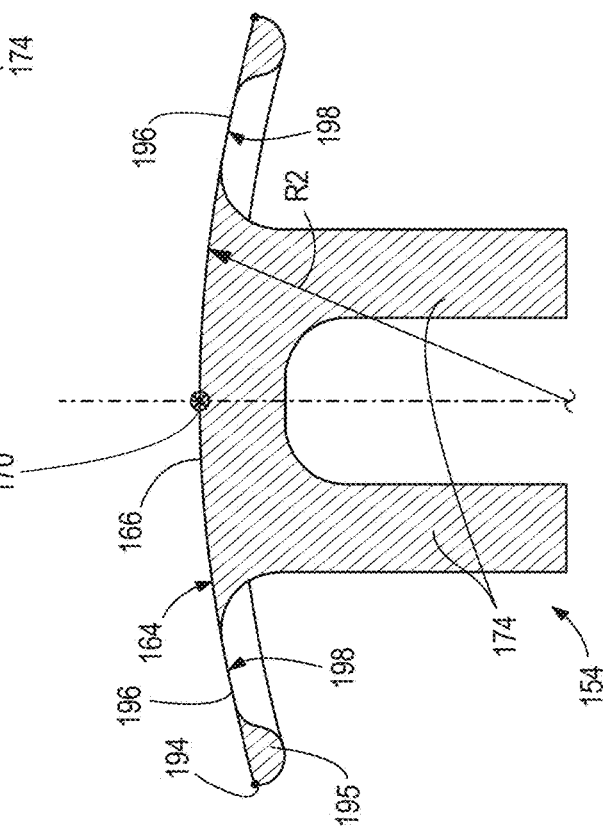
FIG. 10B is a section view of the guide rail of FIG. 10A viewed along section 10B 10B.

FIGS. 10A and 10B illustrate a guide member 164 that has worn beyond the predetermined level (e.g., to an end-of-life level) to expose the elongated window 196 in each of the wear indicator portions 198. In the illustrated embodiment of FIGS. 10A and 10B, the guide member includes four discrete windows 196 generally positioned in four corners of the guide member 164 and/or in four separated regions, such as four indicator portions 198. As illustrated in FIG. 9B, the initial thickness T is defined from the outer surface 166 to the window 196. Thus, the window 196 may have a material thickness of zero such that the window 196 can be an opening, void, and/or the like. However, to maintain some strength in the guide member 164, the lip 195 may be present, and the lip 195 may have thickness.

In practice, less than all of the windows 196 may become exposed at one time. While FIGS. 10A and 10B illustrate a guide member 164 that has worn evenly (e.g., uniformly, with equal amounts of reduction in thickness or arclength, etc.) to expose each window 196 by a similar amount, the guide member 164 could experience wear in different regions and by different amounts such that non-uniform wear occurs. For example, the guide member 164 could wear by a greater amount at the first end 186 than at the second end 190, thereby exposing the window or windows 196 adjacent the first end 186 before exposing the window or windows 196 adjacent the second end 190. The presence of one or more windows 196 provides a clear and effective visual indicator that a guide rail 154 (or at least a guide member 164) needs replacement. The wear indicators 198 may also permit inspection of the guide member 164 while the crawler is assembled to the machine (i.e., without requiring significant disassembly).

As stated above, the guide members 164 wear over time as the shoes 94 (FIG. 4) contact the outer surface 166. A user may inspect the track 92 (FIG. 2) for the presence of windows 196 visible beneath the shoes 94. In one instance, a user could shine a light on the track 92 from above or below the shoes 94. If light can be seen by the user, for example, shining through a window 196 in one of the guide members 164 or on an opposing side or edge of the shoe 94, then the presence of such light can indicate to the user that at least one of the guide member 164 and the shoe 94 needs replacing and/or maintenance. In one specific example, a user standing next to the crawler below the guide member 164 could look upwardly toward the bottom of the guide rail 154. If light (e.g., daylight) is visible through the guide rail 154 as the shoves 94 pass over the guide rail 154, the guide rail 154 may require replacement.

In other embodiments (FIGS. 11-20), the wear indicator portions 198 can be formed in a different manner. The guide members 164 and features thereof described in FIGS. 11-20 are identified with like reference numbers. The wear indicator portions or "wear indicators" are identified with similar reference numbers as wear indicator portions 198 of FIGS. 1-10, plus 100. It should be stated that, while each embodiment of a guide member 164 discussed herein is illustrated as including one embodiment of the wear indicator portion(s) 198, each guide member 164 could include more than one type of wear indicator portion 198 described herein. The guide member 164 is not limited to including only a single type of wear indicator portion, nor are the wear indicator portions limited in discrete parts of the guide member 164, such that different wear indicator portion could be provided in a common part or region of a single guide member 164. Further, it should be understood that multiple guide rails 154 with guide members 164 can be coupled to the track frame 90 in a series or row. Adjacent guide rails 154 can include different wear indicator portions 198. Adjacent guide rails 154 on the track could also include no wear indicator portion 198 such that only a single guide rail 154 in a series includes wear indicators 198. In other words, different embodiments of wear indicator portion 198 may be incorporated in various combinations throughout the series of guide rails 154 on the track frame 90.

As illustrated in FIGS. 11 and 12, each wear indicator 298, 398 may include small recesses and may be positioned along lateral portions of the lower surface of the guide member 164 (FIGS. 11 and 12). As further illustrated in FIGS. 11 and 12, the guide member 164 could include multiple wear indicators 298, 398 in different regions of the guide member 164.

In the embodiment illustrated in FIG. 11, the guide member 164 includes more than two wear indicators 298, such as six generally circular wear indicators 298, on each side of the guide member 164. The wear indicators 298 have a circular shape or cross-section. The wear indicators 298 could also be dome shaped and have a base extending from the bottom surface of the guide member 164.

As illustrated in FIG. 12, some embodiments of the guide member 164 include four elliptical or slightly oblong wear indicators 398 on each side of the guide member 164. The wear indicators 398 could also be slotted.

In the embodiment illustrated in FIG. 13, each wear indicator portion 498 may include elongated recesses that are integrated with the vertical surface of the flanges 174 (FIG. 13). Such embodiments may include more than one wear indicator portion 498 on each side of the guide member 164. As further illustrated in FIG. 13, each of the wear indicators 498 is sloped or chamfered with a surface of the flanges 174. In the illustrated embodiment, the wear indicator 498 is positioned adjacent the holes 182 extending laterally through the flanges 174. The sloped parts of the wear indicators 498 may provide additional space for the fastener (e.g., bolt) received in the holes 182 for securing the guide rail 154 to a portion of the track frame 90 (FIG. 5).

In other embodiments, such as in the embodiment illustrated in FIG. 14, each wear indicator portion 598 may include an elongated pocket having multiple raised sections (FIG. 14), although a pocket having a single raised section (FIG. 6) may avoid restricting directional solidification during manufacture. In addition, the wear indicator portions 598 permit an operator to inspect the guide member 164 while the crawler is assembled on the machine. The wear indicator 598 allows for viewing of the wear indicator 598 from a side of the guide member 164 even when the wear indicator 598 is not viewable from above the guide member 164.

Figure 15:
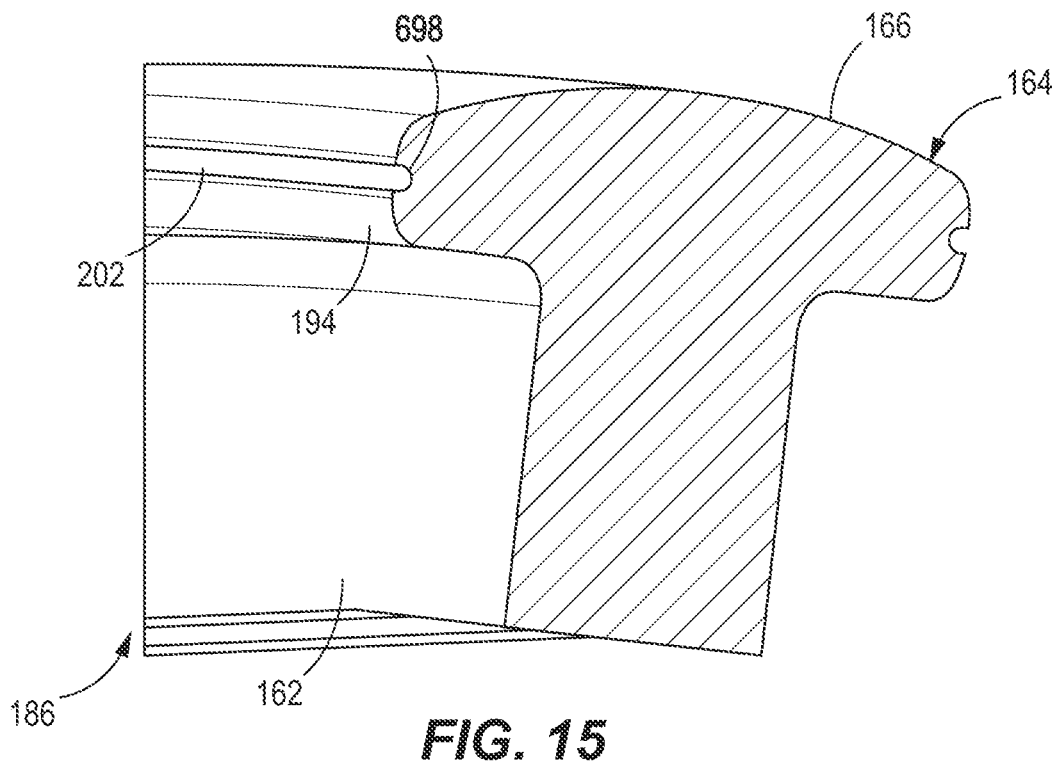
FIG. 15 is a section view of a guide rail according to another embodiment.

As shown in FIG. 15, in other embodiments, the wear indicator portion 698 may include and/or be formed as a runner or groove 202 positioned on a lateral edge of each wing 194 and extending between the first end 186 and the second end 190 (FIG. 14). The groove 202 may permit an operator to easily inspect the guide member 164 from the side while the crawler is assembled on the machine, and to gauge the remaining working life of the guide member 164 (i.e., by evaluating the distance between the outer surface 166 and the groove 202). For example, if the operator views the wear indicator 698 and sees that half of the groove 202 is visible/remains, then the operator can assume that at least a portion of the guide member 164 has begun to wear.

Figure 16:
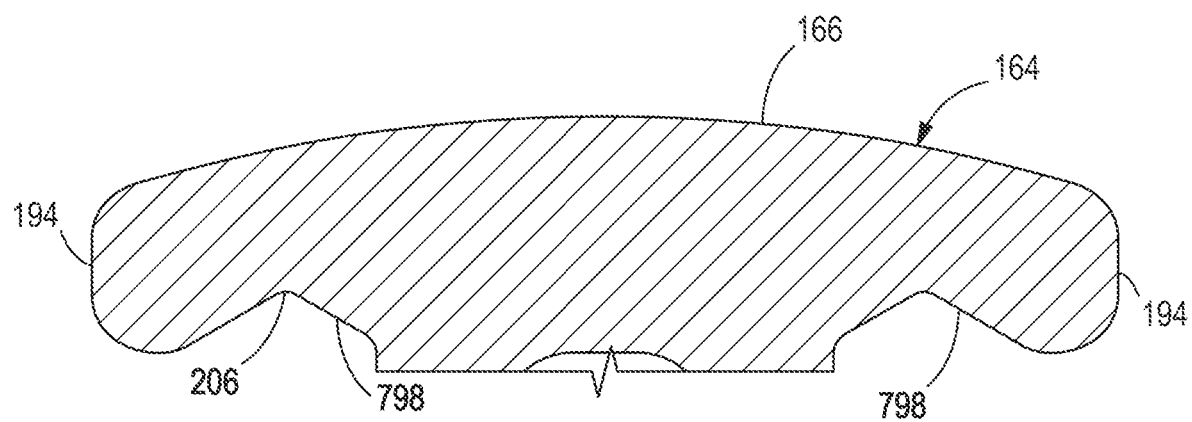
FIG. 16 is a section view of a guide rail according to another embodiment.

As shown in FIG. 16, in some embodiments, the wear indicator portion 798 may be formed as an angled recess in the lower surface of the guide member 164. The recess has a root 206 positioned closest to the outer surface 166. As the guide member 164 wears, a narrowest portion of the recess will become exposed initially as a narrow window. The window will gradually become larger as the guide member 164 wears further (e.g., as the thickness of the outer surface 166 wears). The window may be designed to become visible at an early stage (e.g., adjacent the root 206) to allow an operator to plan for replacement. For example, a large amount of visible wear indicator 798 widow may indicate that the guide rail 154 should be replaced.

Figure 17:
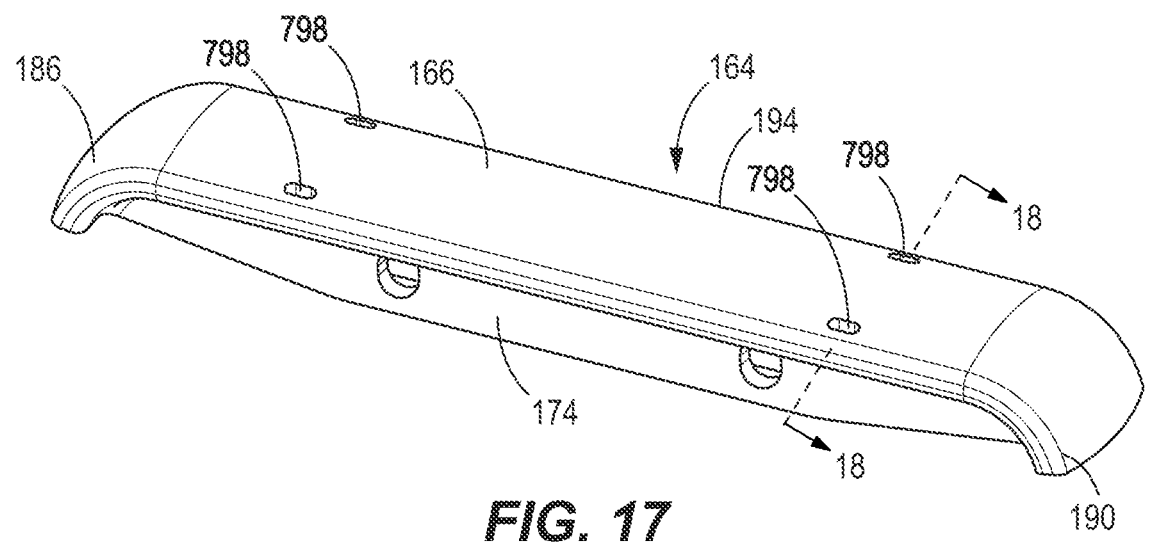
FIG. 17 is a perspective view of a guide rail according to another embodiment.
Figure 18:
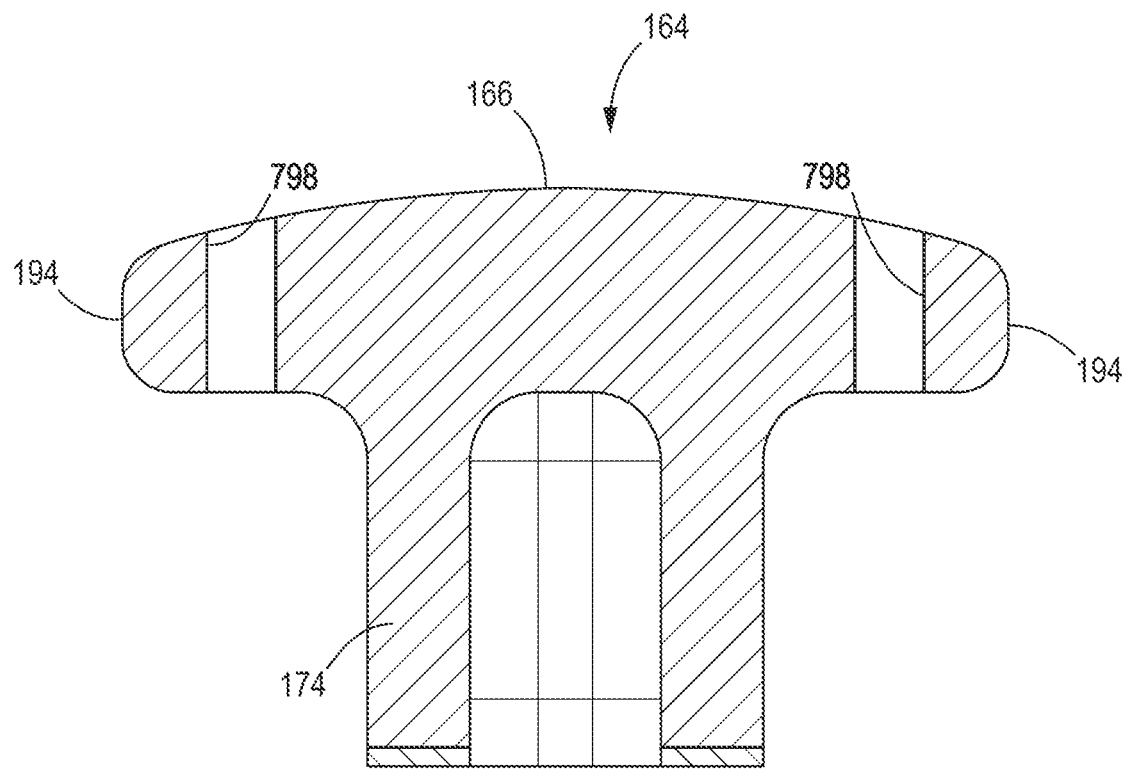
FIG. 18 is a section view of the guide rail of FIG. 17 viewed along section 18-18.

FIGS. 17 and 18 illustrate a guide member 164 in which the wear indicator 898 is formed as a plurality of through-holes extending through the guide member 164 from the outer surface 166 to a lower surface. The through-holes permit an operator to accurately and consistently measure thickness at any time and plan for replacements without requiring the track to be removed from the rail. As shown best in FIG. 18, a depth of the wear indicator 898 becomes more shallow as the thickness of the guide member 164 is reduced.

FIGS. 19 and 20 illustrate a guide member 164 in which the wear indicator portions 998 include recesses formed on a lower surface of the guide member 164 between flanges 174, and aligned along a centerline 170 of the guide member 164. As the guide member 164 wears, openings or windows of the wear indicator 998 will appear along the centerline 170 of the guide rail. The wear indicator 998 further includes a root portion 210. The root portion 210 is generally curved or domed. The wear indicator 998 begins to show once the root portion 210 becomes visible from above the guide member 164. As best illustrated in FIG. 20, the root portion 210 will begin to be visible as a dot, small circle, and/or the like, and gradually increase in diameter as more of the wear indicator 998 becomes visible. Once the root portion 210 is no longer visible/depleted, an opening (e.g., void, recess, etc.) diameter/cross-section of the wear indicator 998 will begin to increase more rapidly. In other words, on opening present in the root portion 210 increases more gradually and indicates that the guide member 164 has begun to wear. In some embodiments, the more rapid increase corresponds to a warning zone for the operator to know that the guide member 164 has begun wearing in a critical zone. The gradual increase may alert the operator that the guide rail 154 will need to be replaced soon.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A replaceable guide rail for a crawler including a frame and a track drivable around the frame, the guide rail comprising:
   a base elongated along a centerline, the base configured to be removably coupled to the frame;
   a wearable portion supported by the base and having an outer surface configured to be in contact with the track, the wearable portion having a first thickness at an initial stage of operation and a second thickness at a second stage of operation, the second thickness being less than the first thickness, the wearable portion including a lateral edge; and
   a wear indicator positioned in the wearable portion between a centerline of the wearable portion and the lateral edge, the wear indicator being covered while the wearable portion has the first thickness, the wear indicator being exposed as an opening extending through the outer surface while the wearable portion has the second thickness.

2. The guide rail of claim 1, wherein a portion of the wear indicator is positioned beneath the wearable portion during the initial stage of operation.

3. The guide rail of claim 2, wherein the wear indicator is visible from above the guide rail while the wearable portion has the second thickness.

4. The guide rail of claim 3, wherein, during the second stage of operation, the wear indicator provides a window through which the track can be viewed from below the guide rail.

5. The guide rail of claim 3, wherein the opening is elongated in a direction parallel to the centerline.

6. The guide rail of claim 1, wherein the first thickness of the wearable portion is defined between the outer surface and the wear indicator during the initial stage of operation.

7. The guide rail of claim 6, wherein the outer surface is arched across the centerline and has a first radius of curvature while the wearable portion has the first thickness, wherein the radius of curvature when the wearable portion has the second thickness is the same or greater than the first radius of curvature.

8. The guide rail of claim 7, wherein the base is arched across the centerline, and further comprising a lip positioned adjacent the lateral edge, the wear indicator being positioned between the lip and the centerline.

9. The guide rail of claim 8, wherein the wear indicator includes a first indicator portion positioned at a first end of the centerline and second indicator portion positioned at a second end of the centerline.

10. The guide rail of claim 1, wherein the wear indicator portion includes a first pair of openings, each of the openings of the first pair of openings positioned on opposite first and second sides of the centerline proximate a first end of the wearable portion, and further including a second pair of openings, each of the openings of the second pair of openings positioned on the opposite first and second sides of the centerline proximate a second end of the wearable portion.

11. A crawler assembly for an earthmoving machine, the crawler assembly comprising:
   a plurality of shoes coupled together to form a continuous track, the track being configured to be driven around a perimeter of a crawler frame;
   a replaceable guide rail configured to be removably coupled to the frame, the guide rail including a surface contacting the shoes as the track is driven around the perimeter of the frame, the surface including a material that wears away as the shoes contact the surface; and
   a wear indicator positioned on the guide rail between a centerline of the guide rail and a lateral edge of the guide rail, the wear indicator being exposed as an opening extending through the outer surface of the guide rail as the shoes contact the guide rail.

12. The crawler assembly of claim 11, wherein the replaceable guide rail is a first guide rail in a plurality of replaceable guide rails each elongated along a centerline and configured to be coupled to the frame, and wherein the plurality of guide rails is configured to be coupled to the frame in a sequence with the centerline of at least one guide rail aligned with at least two shoes coupled together.

13. The crawler assembly of claim 12, wherein the first guide rail is positioned end-to-end with a second replaceable guide rail in a direction of travel of the plurality of shoes.

14. The crawler assembly of claim 11, wherein the surface of the guide rail that contacts the shoes is arched laterally across the centerline and has a radius of curvature while the material has a first thickness, wherein as the material wears, the radius of curvature remains the same or increases.

15. The crawler assembly of claim 14, wherein the material has a thickness defined between the surface and the wear indicator, and wherein the thickness decreases as the material wears away to expose the wear indicator.

16. The crawler assembly of claim 11, wherein the wear indicator is a first wear indicator of a plurality of wear indicators each positioned in at least one of four different wear indicator regions, at least two wear indicator regions being positioned on opposite sides of the centerline of the guide rail, and at least two wear indicator regions being positioned on opposite ends of the centerline.

17. The crawler assembly of claim 16, wherein each of the plurality of wear indicators provides a window that visibly exposes the track when viewed from below the replaceable guide rail.

18. A replaceable guide rail for a crawler of an earthmoving machine, the guide rail comprising:
   a base elongated along a centerline, the base including a flange;
   a hole extending laterally through the flange, the hole being configured to receive a fastener to secure a portion of the crawler to the flange;
   a guide member extending along the centerline and being configured to contact a track portion of the crawler and be worn down during movement of the track portion over the guide member, the guide member having a thickness that is reduced as the guide member is worn down; and
   a wear indicator positioned in the guide member between the centerline and the lateral edge of the guide member, the wear indicator configured to indicate whether the guide rail is in condition for replacement, the wear indicator being covered while the thickness is in a first range of thickness, and the wear indicator being exposed as an elongated opening extending through an outer surface while the thickness is in a second range of thickness.

19. The replaceable guide rail of claim 18, wherein the wear indicator is at least partially positioned in the base such that the first range of thickness extends from an outer surface of the guide member to the base and the second range of thickness extends from within the guide member to within the base.

20. The replaceable guide rail of claim 18, wherein a greater portion of the wear indicator becomes exposed as the thickness decreases.

* * * * *